United States Patent
Cremer et al.

(10) Patent No.: US 11,317,144 B2
(45) Date of Patent: *Apr. 26, 2022

(54) DETECTION OF MUTE AND COMPENSATION THEREFOR DURING MEDIA REPLACEMENT EVENT

(71) Applicant: Roku, Inc., San Jose, CA (US)

(72) Inventors: Markus K. Cremer, Orinda, CA (US); Shashank Merchant, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,532

(22) Filed: Apr. 13, 2020

(65) Prior Publication Data

US 2020/0245024 A1 Jul. 30, 2020

Related U.S. Application Data

(63) Continuation of application No. 16/433,530, filed on Jun. 6, 2019.

(Continued)

(51) Int. Cl.
*H04N 21/439* (2011.01)
*H04N 21/81* (2011.01)
(Continued)

(52) U.S. Cl.
CPC ... *H04N 21/44016* (2013.01); *H04N 21/4396* (2013.01); *H04N 21/442* (2013.01);
(Continued)

(58) Field of Classification Search
CPC ......... H04N 21/44016; H04N 21/4396; H04N 21/4622; H04N 21/812
See application file for complete search history.

(56) References Cited

U.S. PATENT DOCUMENTS 7,012,653 B1 * 3/2006 Strickland .............. H04N 7/163
348/553
2008/0307454 A1 12/2008 Ahanger et al.
(Continued)

FOREIGN PATENT DOCUMENTS

| KR | 10-2014-0026752 A | 3/2014 |
| KR | 10-1579283 B1 | 12/2015 |
| WO | 2020/101819 A1 | 5/2020 |

OTHER PUBLICATIONS

International Search Report areceived for PCT Patent Application No. PCT/US2019/054798, dated Jan. 23, 2020, 5 pages.

(Continued)

*Primary Examiner* — Pinkal R Chokshi
(74) *Attorney, Agent, or Firm* — McDonnell Boehnen Hulbert & Berghoff LLP (57) ABSTRACT

In one aspect, an example method includes (i) presenting, by a playback device, first media content from a first source; (ii) encountering, by the playback device, a trigger to switch from presenting the first media content from the first source to presenting second media content from a second source; (iii) determining, by the playback device, that the playback device is presenting the first media content from the first source in a muted state; and (iv) responsive to encountering the trigger, and based on the determining that the playback device is presenting the first media content from the first source in a muted state, presenting, by the playback device, the second media content from the second source in the muted state.

11 Claims, 5 Drawing Sheets

Related U.S. Application Data (60) Provisional application No. 62/768,587, filed on Nov. 16, 2018.

(51) Int. Cl.
*H04N 21/44* (2011.01)
*H04N 21/462* (2011.01)
*H04N 21/442* (2011.01)
*G06Q 30/02* (2012.01)

(52) U.S. Cl.
CPC ....... *H04N 21/4622* (2013.01); *H04N 21/812* (2013.01); *G06Q 30/0251* (2013.01)

(56) References Cited

U.S. PATENT DOCUMENTS

| | | | | |
|---|---|---|---|---|
| 2010/0053452 | A1* | 3/2010 | Abe | H04N 5/147 348/700 |
| 2010/0088714 | A1* | 4/2010 | Hawkins | H04N 21/26603 725/14 |
| 2011/0166932 | A1* | 7/2011 | Smith | H04N 21/458 705/14.53 |
| 2013/0121666 | A1* | 5/2013 | Furuya | H04N 21/440263 386/248 |
| 2015/0012938 | A1* | 1/2015 | Kosslyn | G06F 16/683 725/32 |
| 2015/0142538 | A1* | 5/2015 | DuVall | H04L 65/60 705/14.6 |
| 2015/0350694 | A1* | 12/2015 | Meembat | H04N 21/236 725/32 |
| 2015/0356612 | A1* | 12/2015 | Mays | G06Q 30/0241 705/14.61 |
| 2018/0234728 | A1* | 8/2018 | Hwang | H04N 21/4316 |
| 2020/0077146 | A1* | 3/2020 | Conklin | H04N 21/4394 |
| 2020/0162788 | A1 | 5/2020 | Cremer et al. | |

OTHER PUBLICATIONS

Written Opinion received for PCT Patent Application No. PCT/US2019/054798, dated Jan. 23, 2020, 7 pages.

Final Office Action for U.S. Appl. No. 16/433,530 dated Mar. 1, 2021.

Non-Final Office Action for U.S. Appl. No. 16/433,530 dated Oct. 26, 2020.

Advisory Action for U.S. Appl. No. 16/433,530 dated May 6, 2021.

Non-Final Office Action for U.S. Appl. No. 16/433,530 dated Aug. 10, 2021.

* cited by examiner

Reference Fingerprint Generator — 212
- Patch Selection Module — 214
- Value Calculation Module — 216

Query Fingerprint Generator — 242
- Patch Selection Module — 244
- Value Calculation Module — 246

Video Identification System — 250
- Index Module — 252
- Fingerprint Match Module — 254
- Identifcation Module — 256

Figure 3

```
┌─────────────────────┐                      ┌─────────────────────┐
│ ─ 240               │                      │ ─ 260               │
│ Playback Device     │                      │ Replacement         │
│   ┌─243             │                      │ Content Server      │
│   ┌─────────────┐   │                      │   ┌─262             │
│   │   Audio     │   │                      │   ┌─────────────┐   │
│   │  Analysis   │◄──┼──────────────────────┼──►│   Video     │   │
│   │   Module    │   │                      │   │  Provision  │   │
│   └─────────────┘   │                      │   │   Module    │   │
│   ┌─245             │                      │   └─────────────┘   │
│   ┌─────────────┐   │                      └─────────────────────┘
│   │             │   │
│   │  Classifier │   │
│   │             │   │
│   └─────────────┘   │
│   ┌─247             │
│   ┌─────────────┐   │
│   │ Playback-   │   │
│   │modification │   │
│   │   Module    │   │
│   └─────────────┘   │
│   ┌─242             │
│   ┌─────────────┐   │
│   │   Query     │   │
│   │ Fingerprint │   │
│   │  Generator  │   │
│   └─────────────┘   │
└─────────────────────┘
```

DETECTION OF MUTE AND COMPENSATION THEREFOR DURING MEDIA REPLACEMENT EVENT

CROSS-REFERENCE TO RELATED APPLICATIONS

This disclosure is a continuation of, and claims priority to, U.S. patent application Ser. No. 16/433,530 filed on Jun. 6, 2019, which claims priority to U.S. Provisional Patent App. No. 62/768,587 filed on Nov. 16, 2018, each of which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In coming years, the replacement of advertisements in media content with targeted advertisements is expected to become an increasingly important advertising method. By way of example, in a dynamic advertisement insertion (DAI) system, a content provider can insert generic advertisements into advertisement-breaks that interrupt sequences of media content, such as live or pre-recorded content. Each advertisement-break can include a set of advertisements arranged in a predetermined order. Further, a particular one of the advertisements can be designated or dynamically selected to be replaced with replacement media content, such as a targeted advertisement.

With this arrangement, prior to displaying the particular advertisement, the playback device can obtain the replacement media content, and then provide the replacement media content for display instead of the particular advertisement. For instance, responsive to determining that the playback device is playing or about to play content immediately preceding the particular advertisement to be replaced, the playback device can retrieve a targeted advertisement from a database, and then provide the targeted advertisement for display in place of the particular advertisement at the appropriate time.

SUMMARY

In one aspect, an example method is disclosed. The method includes (i) presenting, by a playback device, first media content from a first source; (ii) encountering, by the playback device, a trigger to switch from presenting the first media content from the first source to presenting second media content from a second source; (iii) determining, by the playback device, that the playback device is presenting the first media content from the first source in a muted state; and (iv) responsive to encountering the trigger, and based on the determining that the playback device is presenting the first media content from the first source in the muted state, presenting, by the playback device, the second media content from the second source in the muted state.

In another aspect, an example non-transitory computer-readable medium is disclosed. The computer-readable medium has stored thereon program instructions that upon execution by a processor, cause performance of a set of acts including (i) presenting first media content from a first source; (ii) encountering a trigger to switch from presenting the first media content from the first source to presenting second media content from a second source; (iii) determining that the first media content from the first source is being presented in a muted state; and (iv) responsive to encountering the trigger, and based on the determining that the first media content from the first source is being presented in the muted state, presenting the second media content from the second source in the muted state.

In another aspect, an example computing system is disclosed. The computing system is configured for performing a set of acts including (i) presenting first media content from a first source; (ii) encountering a trigger to switch from presenting the first media content from the first source to presenting second media content from a second source; (iii) determining that the first media content from the first source is being presented in a muted state; and (iv) responsive to encountering the trigger, and based on the determining that the first media content from the first source is being presented in the muted state, presenting the second media content from the second source in the muted state.

DETAILED DESCRIPTION

I. Overview

During a media content replacement event on a playback device, second media content (i.e. replacement media content) is presented in lieu of a portion of first media content. For instance, during a media content replacement event, a segment of first media content received from a first source is replaced with second media content received from a second source. To effect the replacement, the playback device can switch from presenting first media content that is received from the first source to presenting second media content that is received from the second source.

In some cases, any volume playback information of the first source, which may be set by a device providing an audio signal to the playback device, might not be accessible to the playback device. As a consequence, upon switching to presenting media content from the second source, the playback device may present the replacement media content at a volume that does not correspond to the volume at which the content being presented prior to the switching is being presented. This can lead to a poor or frustrating user-experience for the viewer. For instance, the viewer might have muted the first media content by providing a mute command to a device providing an audio signal to the playback device and, due to the switching, the playback device might present the second media content in an unmuted state.

Disclosed herein are methods and systems to address this and potentially other issues. In an example method, a playback device can present first media content from a first source. The playback device can then encounter a trigger to switch from presenting the first media content from the first source to presenting second media content from a second source. Further, the playback device can determine that the playback device is presenting the first media content from the first source in a muted state. Responsive to encountering the trigger, and based on the determining that the playback device is presenting the first media content from the first source in the muted state, the playback device can present the second media content from the second source in the muted state. In this manner, when the first media content is being presented in a muted state, the second media content can also be presented in the muted state, thereby creating a smooth transition from presenting the first media content to presenting the second media content.

II. Example Architecture

A. Computing Device

Figure 1:
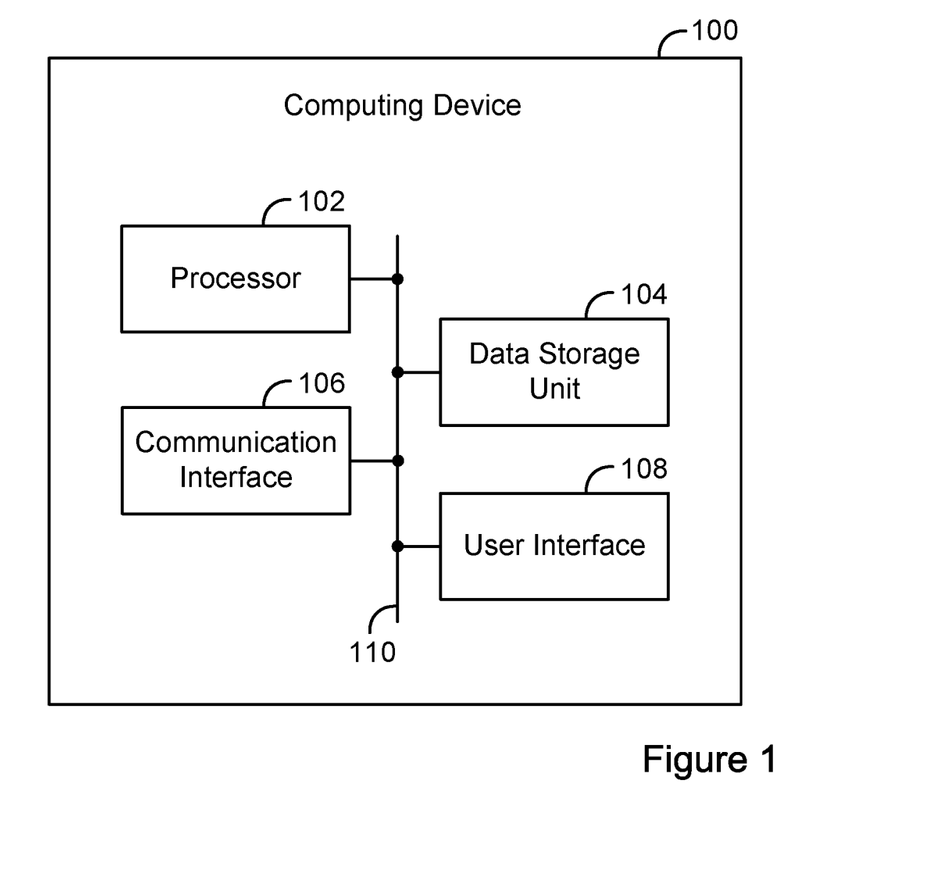
FIG. 1 is a simplified block diagram of an example computing device.

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, a mobile phone, or a television.

B. Dynamic Advertisement Insertion (DAI) System

Figure 2:
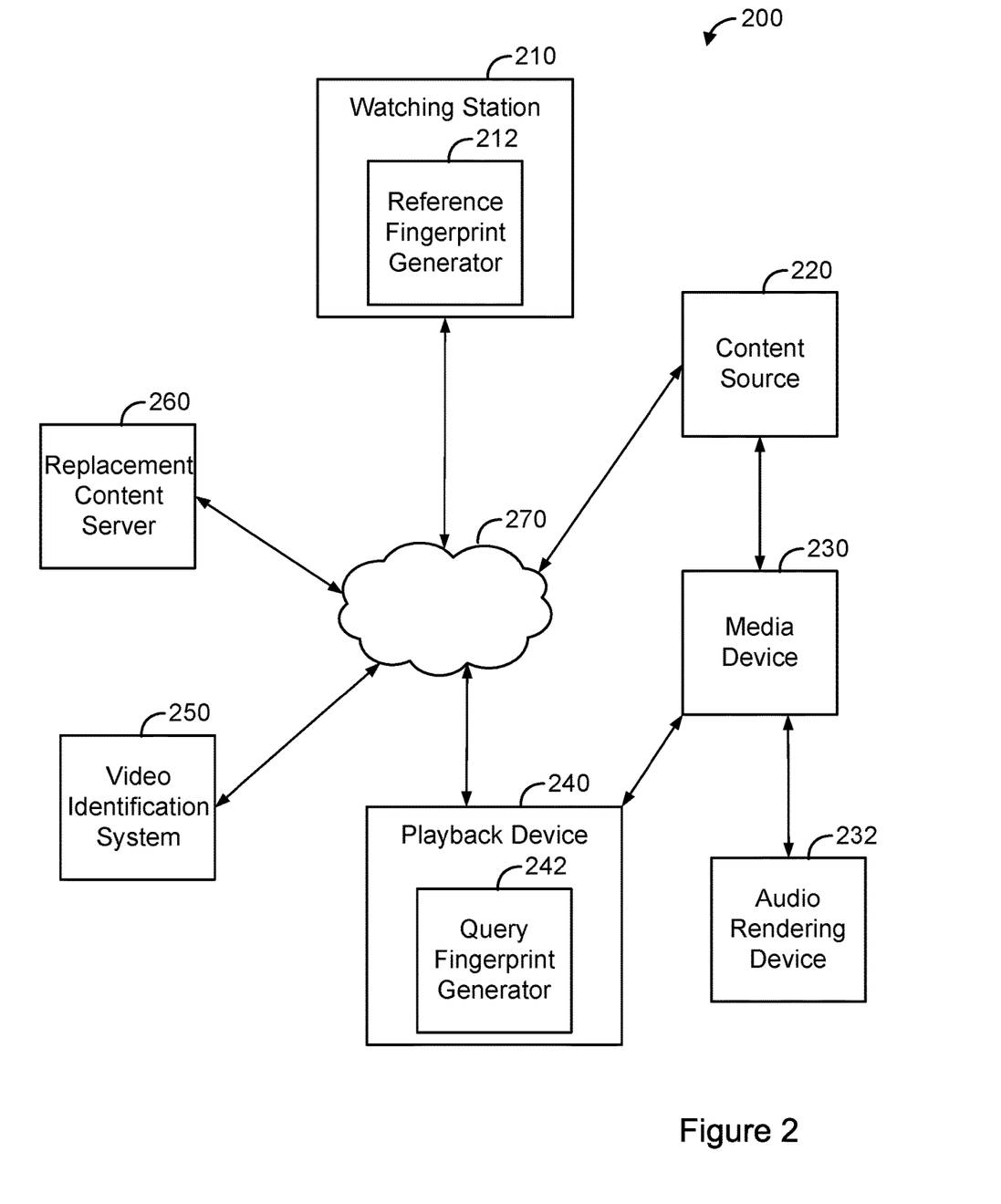
FIG. 2 is a simplified block diagram of an example dynamic advertisement insertion (DAI) system.

FIG. 2 is a simplified block diagram of an example DAI system 200. The DAI system 200 can perform various acts and/or functions related to the delivery and/or presentation of media content (e.g., audio content and/or video content), and can be implemented as a computing system.

DAI system 200 can include various components, such as a watching station 210, a content source 220, a media device 230, an audio rendering device 232 a playback device 240, a video identification system 250, and a replacement content server 260, each of which can be implemented as a computing system. Watching station 210 can receive video and other multimedia content from content source 220, such as a broadcaster, web server, or cable television (TV) station. For example, content source 220 may be a broadcaster, such as a TV station or TV network, which streams or transmits media over a TV channel to watching station 210, and/or a web service, such as a website, that streams or transmits media over a network 270 to watching station 210. Watching station 210 includes a reference fingerprint generator 212 that generates reference fingerprints of video content received from content source 220.

Media device 230 can receive the video and other multimedia content from content source 220, such as via a broadcast channel and/or over network 270. Media device 230 can modify the received content before sending content to playback device 240. Media device 230 can include a tuner configured to receive an input stream of video content and generate an output stream of video content by processing the input stream. Media device 230 can be a device equipped with tuners, decoders, and other hardware and/or software such that media device 230 can access video content through a video content distribution network, such as a terrestrial broadcast, cable, and/or satellite broadcast network employed by multichannel video programming distributors. Additionally or alternatively, media device 230 can be a device equipped with network adapters, decoders, and other hardware and/or software such that media device 230 can access video content through a wide area network (e.g., the internet) employed by devices for accessing internet video streaming services. Media device 230 can output signals (e.g., digital or analog signals) usable by a display of playback device 240 to present video content to a user.

In some examples, media device 230 can output audio signals to playback device 240. Additionally or alternatively, media device 230 can output audio signals to audio rendering device 232, and audio rendering device 230 can output audio while playback device 240 presents video corresponding to the audio. Audio rendering device 230 can include one or more speakers or an audio receiver that is communicatively linked to one or more speakers.

Playback device 240 is any device capable of receiving and presenting a stream of video and/or other multimedia content (e.g., a TV, a laptop or other personal computer (PC), a tablet or other mobile device, or a gaming device). Playback device 240 includes a display or other user interface configured to display a processed stream of video content. The display may be a flat-panel screen, a plasma screen, a light emitting diode (LED) screen, a cathode ray tube (CRT), a liquid crystal display (LCD), or a projector. Playback device can also include one or more speakers. In addition, playback device 240 can include an antenna configured to receive audio and video by way of an over-the-air broadcast channel.

Network 270 may be any network that enables communication between devices, such as a wired network and/or a wireless network (e.g., a mobile network). Network 270 can include one or more portions that constitute a private network (e.g., a cable TV network or a satellite TV network) or a public network (e.g., over-the-air broadcast channels or the internet).

Video identification system 250 can communicate with watching station 210 and playback device 240 over network 270. Video identification system may receive a query fingerprint generated from video content by a query fingerprint generator 242 of playback device 240, and query an index of known fingerprints generated by a reference fingerprint generator 212 of watching station 210 in order to identify the video content. The query fingerprint may be a fingerprint of a frame or block of frames within the video content. Video identification system can identify the video content by matching the query fingerprint with one or more reference fingerprints. In some examples, video identification system 250 can be a component or module of playback device 240 or media device 230.

Upon identifying the video content, video identification system 250 can return to playback device 240 an identifier for replacement media content (e.g., alternative programming or alternative commercials) associated with the video content. The replacement media content can be stored in replacement content server 260. Using the identifier, playback device 240 can access the replacement media content from replacement content server 260 and then provide the replacement media content for display. Alternatively, replacement content server 260 or another computing system can send the replacement media content to playback device 240 or media device 230 in advance, for storage in a local cache of playback device 240 or media device 230. In this implementation, playback device 240 can access the replacement media content from the local cache, and then provide the replacement media content for display.

Any of the modules, systems, and/or generators may be located at any of the devices shown in FIG. 2. For example, video identification system 250 can include query fingerprint generator 242. With this arrangement, video identification system can receive frames of video content from playback device 240 and generate the query fingerprints using the frames of video content. As another example, media device 230 and playback device 240 can be integrated together within a single device. Other variations are also possible.

Figure 3:
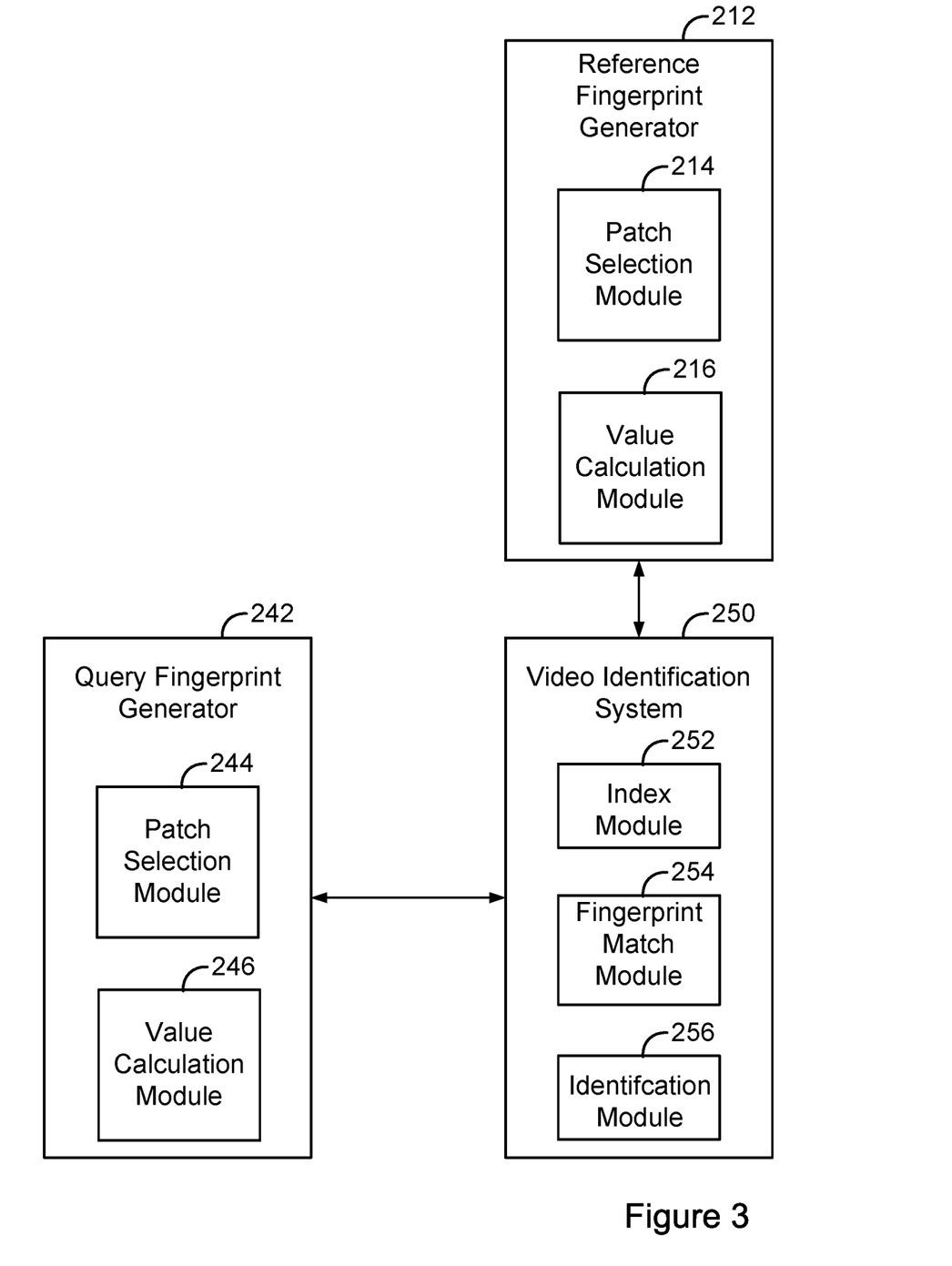
FIG. 3 is a simplified block diagram illustrating components of a reference fingerprint generator, a query fingerprint generator, and a video identification system, according to an example embodiment.

FIG. 3 is a simplified block diagram illustrating components of reference fingerprint generator 212, query fingerprint generator 242, and video identification system 250. As shown in FIG. 3, query fingerprint generator 242 includes a patch selection module 244 and a value calculation module 246, configured to communicate with each other (e.g., via a bus, shared memory, or a switch). Further, video identification system 250 includes an index module 252, a fingerprint match module 254, and an identification module 256, all configured to communicate with each other. Still further, reference fingerprint generator 212 includes a patch selection module 214 and a value calculation module 216, configured to communicate with each other.

One or more of the modules depicted in FIG. 3 can be implemented using hardware (e.g., a processor of a machine, a field-programmable gate array (FPGA), or an application-specific integrated circuit (ASIC), or a combination of hardware and software. Moreover, any two or more of the modules depicted in FIG. 3 can be combined into a single module, and the function described herein for a single module can be subdivided among multiple modules.

In line with the discussion above, query fingerprint generator 242 and reference fingerprint generator 212 can be configured to generate a query fingerprint of one or more frames of video content. For example, query fingerprint generator 242 and reference fingerprint generator 212 can calculate values of patches of one or more frames within the video content. Patches can be located at different locations within a frame. Query fingerprint generator 242 and reference fingerprint generator 212 can be configured to combine query fingerprints from multiple frames to generate a query fingerprint of a block of frames of the video content.

By way of example, patch selection module 244 of query fingerprint generator 242 can be configured to select multiple patches of video content, such as patches associated with one or more regions of a frame or frames within the video content. Similarly, patch selection module 214 of reference fingerprint generator 212 can be configured to select multiple patches of video content, such as patches associated with one or more regions of a frame of frames within the video content.

Patches can be defined by dividing a frame into a grid, such as a 2×2 grid, a 4×3 grid, or a 4×4 grid, and selecting patches based on the grid. For instance, twenty patches may be selected, with four large patches corresponding to quadrants of a frame, and four small patches corresponding to sub-quadrants of each quadrant (i.e. sixteen small patches in total). In some instances, patches may overlap. Further, patches can cumulatively span less than the entirety of a frame.

Value calculation module 246 of query fingerprint generator 242 can be configured to calculate a value for each of the selected multiple patches using, for example, an integral image technique. The integral image technique may calculate the values using a summed area table or other data structure that generates a sum of values of a group of pixels. Similarly, value calculation module 216 of reference fingerprint generator 212 can be configured to calculate a value for each of the selected multiple matches using, for example, an integral imaging technique.

In some examples, value calculation module 246 and value calculation module 216 can calculate a value for a patch by summing the values of a group of pixels with the patch, averaging the values of a group of pixels, or determining a media value of the group of pixels. Additionally or alternatively, value calculation module 246 and value calculation module 216 can calculate a value for a patch by computing differences between values of a group of pixels or computing a linear combination of values of a group of pixels.

Index module 252 of video identification system 250 can be configured to query a database of known reference fingerprints of video content, such as a database of known fingerprints stored within watching station 210 or video identification system 250, in order to identify reference fingerprints potentially matching a query fingerprint. Index module 252 can be configured to query an index of quantized patch values of the known reference fingerprints.

Fingerprint match module 254 of video identification system can be configured to compare a query fingerprint to one or more known reference fingerprints, and determine that the query fingerprint matches at least one known reference fingerprint. For example, fingerprint match module 254 can determine that query fingerprint matches at least one known reference fingerprint by determining that a similarity between the query fingerprint and at least one of the known reference fingerprints satisfies a predetermined threshold. The predetermined threshold can be associated with a Tanimoto distance measurement, a Manhattan distance measurement, or other distance measurements. Additionally or alternatively, fingerprint match module 254 can use other matching techniques, such as Euclidian, Cosine, KL-Divergence, and/or Itakura matching techniques.

Identification module 256, in turn, can be configured to identify video content based on a determination that a query fingerprint(s) matches at least one reference fingerprint(s). For example, identification module 256 can identify the name or title of video content, a location within the video content currently being presented by playback device 240, and/or a channel or broadcaster providing the video content.

Figure 4:
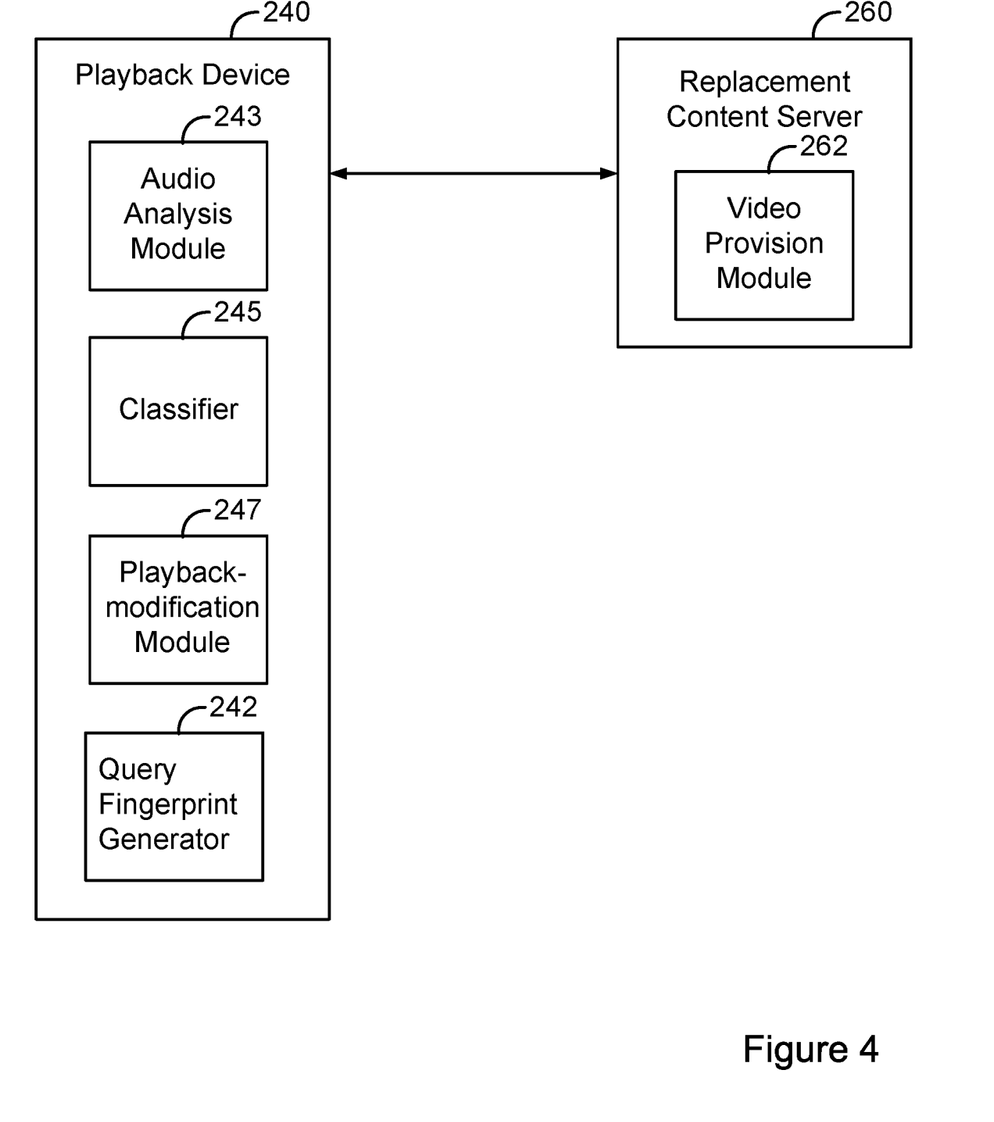
FIG. 4 is a simplified block diagram illustrating components of a playback device and a replacement content server, according to an example embodiment.

FIG. 4 is a simplified block diagram illustrating components of playback device 240 and replacement content server 260. As shown in FIG. 4, in addition to query fingerprint generator 242, playback device 240 includes an audio analysis module 243, a classifier 245, and a playback-modification module 249, which can be configured to communicate with each other. Further, replacement content server 260 includes a video provision module 262.

In line with the discussion above, playback device 240 can encounter a trigger to carry out a media content replacement event. The media content replacement event can involve switching from presenting first media content from a first source to presenting second media content from a second source. The first source can be a first content pipe, and the second source can be a second content pipe that is different from the first content pipe. For instance, the first source can be either an over-the-air antenna or media device 230, and the second source can be either the Internet or a local cache of playback device 240. As a particular example, the first media content can be a first multimedia segment that is received by way of an over-the-air antenna or media device 230, and the second media content can be a second multimedia segment that is received from replacement content server 260 over network 270 and stored in a local cache of playback device 240. Alternatively, the first source can be an over-the-air antenna, and the second source can be media device 230. As another example, the first source can be network 270 (e.g., the first media content can be a multimedia stream), and the second source can be either a local cache of playback device 240 or media device 230.

Encountering the trigger can involve determining that playback device 240 is presenting a first segment that occurs immediately prior to a second segment that is to be replaced. Playback device 240 could determine that the first segment is being presented using any of the fingerprinting techniques discussed above. Alternatively, encountering the trigger can involve playback device 240 receiving a replacement command from another device.

In some instances, responsive to encountering a trigger to carry out a media replacement event, playback device 240 can then instruct audio analysis module 243 to determine whether or not playback device 240 is presenting media content in a muted state. In other instances, playback device 240 can determine that first media content is being presented in a muted state prior to encountering a trigger to carry out a media replacement event. For instance, audio analysis module 243 can be configured to periodically determine whether playback device 240 is presenting media content in a muted state. As another example, audio analysis module 243 can be configured to determine whether playback device 240 is presenting media content in a muted state upon detecting a channel-change event. Responsive to encountering such a trigger, and based on a determination that playback device 240 is presenting first media content in a muted state, audio analysis module 243 can output an instruction to present the replacement media content in a muted state. For instance, audio analysis module 243 can output such an instruction to playback-modification module 247.

Audio analysis module 243 can include one or more processors and a memory storing instructions that are executable by the one or more processors to carry out various functions, such as determining whether or not playback device 240 is presenting media content in a muted state. Audio analysis module 243 can determine whether or not playback device 240 is presenting content in a muted state in various ways.

By way of example, audio analysis module 243 can detect within an audio signal associated with first media content a silent period having a duration that satisfies a threshold condition. The threshold condition can be the duration of the silent period exceeding a threshold duration (e.g., one second, three seconds, etc.). The threshold duration can be determined heuristically based on an analysis of the durations of silent periods occurring in a sample of unmuted audio content. The first media content could be presented on a first channel, and the sample of unmuted content could be a sample of unmuted audio content that has previously been presented on the first channel.

Audio analysis module 243 could also determine whether or not the silent period is within a threshold time of a time at which a media content replacement event is scheduled to occur. Based on the silent period satisfying the threshold condition and the silent period occurring within the threshold time of the time at which the media content replacement event is scheduled to occur, the audio analysis module 243 could determine that the playback device is presenting the first media content in the muted state.

Audio analysis module 243 can also determine whether playback device 240 is presenting media content in a muted state by detecting a transition from an unmuted state to the muted state. For instance, audio analysis module 243 can detect within an audio signal associated with first media content a transition from an unmuted state to the muted state. Audio analysis module 243 can detect such a transition using classifier 245.

Classifier 245 can include a classifier that is trained using a training data set. The training data set can include audio signals that are indicative of mute operations, such as audio signals that are known to include user-triggered or device-triggered mute operations. A portion of these audio signals may have been muted due to mute operations carried out by a set-top box or audio receiver, for instance. The training data set can also include audio signals that are known to not include mute operations. After classifier 245 is trained using the training data set, classifier 245 can be configured to receive an audio signal, process the audio signal, and output data indicative of whether or not the audio signal includes a transition form an unmuted state to the muted state. The data output by classifier 245 can be a binary output (e.g., yes or no) or a probability indicative of a likelihood that the audio signal includes a transition from an unmuted state to the muted state. In an example in which classifier 245 outputs a probability, audio analysis module 243 can compare the probability to a probability threshold, so as to determine whether or not the audio signal includes a transition from an unmuted state to a muted state.

Classifier 245 can include a neural-network based classifier, a Gaussian-mixture-model classifier, or another type of classifier. Characteristics of an audio signal that includes a mute operation may differ from characteristics of an audio signal that happens to include a transition to a period of silence. For instance, a transition from unmuted audio content to muted audio content may be more abrupt as compared to a transition from noise to a period of silence. By understanding these characteristics, classifier 245 can reliably distinguish audio signals that include mute operations from audio signals that happen to include transitions from noise to silence. In some examples, classifier 245 can be a component or module of audio analysis module 243.

Alternatively, audio analysis module 243 can determine whether playback device 240 is presenting media content in a muted state by determining that an audio signal associated with first media content being presented by playback device 240 is absent. When media content is received from a source, the media content can include auxiliary information related to audio content. The auxiliary information can specify a sampling frequency, encoding information, a number of channels, etc. Audio analysis module 243 can determine that the audio signal associated with the first media content is absent based on audio analysis module 243 being unable to successfully receive the auxiliary information when attempting to receive and process the audio signal associated with the first media content.

Another way for audio analysis module 243 or another module of playback device 240 to determine that playback device 240 is presenting media content in a muted state is to determine that playback device 240 is displaying a mute symbol overlay. For example, audio analysis module 243 can scan the video signal from the first source for a mute symbol overlay. Scanning the video signal for a mute symbol overlay can involve using template matching to analyze an image and to thereby determine whether a part of the image matches a template image corresponding to the mute symbol overlay. The part of the image may correspond to a region of a display of the playback device in which the mute symbol overlay is provided.

In some examples, playback device 240 might be presenting media content in a muted state because audio is being rendered for playback by a separate device, such as audio rendering device 232. Accordingly, in some instances, based on a determination that playback device 240 is presenting media content in a muted state, audio analysis module 243 or a separate module may further determine whether audio is being rendered for playback by a separate device.

In some instances, audio analysis module 243 can determine whether or not audio is being rendered for playback by a separate device by leveraging universal plug and play (UPNP) protocol. Through use of the UPNP protocol, audio analysis module 243 can discover the presence of the audio rendering device on a network. Audio analysis module 243 can then use data captured by a microphone of playback device 240 to determine whether or not the audio is being presented in a muted state by the separate device.

If a communication path does not exist between playback device 240 and audio rendering device 242, audio analysis module 243 can use the microphone to determine that audio is being rendered for playback by a separate device. For example, audio analysis module 243 can use a microphone of playback device 240 to detect audio in the room, create an audio fingerprint using audio captured by the microphone, and compare the audio fingerprint with audio corresponding to media content that is being presented by playback device 240. Comparing the audio fingerprint with the audio corresponding to the media content can involve comparing the audio fingerprint with a reference fingerprint provided to the playback device 240 by a server. Alternatively, comparing the audio fingerprint with the audio corresponding to the media content can involve sending the audio fingerprint to a server for analysis at the server, and receiving an indication from the server of whether or not the audio fingerprint corresponds to the media content that is being presented by playback device 240. Instead of or in addition to creating an audio fingerprint from the captured audio, audio analysis module 243 can extract a watermark from the captured audio, and use the watermark to determine whether the captured audio corresponds to the media content that is being presented by playback device 240.

In a scenario in which audio analysis module 243 determines that (i) playback device 240 is presenting media content in a muted state and (ii) a separate device is rendering audio corresponding to the media content in an unmuted state, audio analysis module 243 can output an instruction to forgo carrying out a media content replacement event. This can help avoid the situation in which playback device 240 presents replacement media content in place of replaceable media content while the separate device outputs audio corresponding to the replaceable media content.

Video provision module 262 can provide replacement media content to playback device 240. For instance, video identification system 250 can identify video content that playback device 240 is providing for display and, based on the identified video content, video provision module 262 can provide replacement media content corresponding to the video content to playback device 240.

Playback device 240 can receive the replacement media content by way of a network communication interface. For instance, the replacement media content can be streamed to playback device 240 over the Internet and then stored in a local cache of playback device 240. When playback device 240 receives a trigger to insert the replacement media content into a sequence of media content, playback device 240 can retrieve the replacement media content from the local cache, and provide the replacement media content for display using a media player that is configured to display media files. When playback device 240 provides the replacement media content for display using a media player, the media player can present the replacement media content in a media-player layer that is on top of another layer in which other media content is provided for display, such as media content received from a media device or an antenna.

In some instances, providing the replacement media content for display can involve switching from providing media content that is received from media device 230 or an antenna to providing replacement media content that is stored in a database of playback device 240. Playback device 240 can include a system on a chip that includes a frame buffer. In order to provide the replacement media content for display, the media player of playback device 240 can insert the replacement media content into the frame buffer. Prior to inserting the replacement media content into the frame buffer, the system on a chip may have inserted media content that is received from media device 230 into the frame buffer.

The replacement media content can include a replacement advertisement. For instance, the replacement media content can include targeted advertisement that is to be substituted for a generic advertisement. As one example, the targeted advertisement can be a local advertisement, and the generic advertisement can be a national advertisement. As another example, the targeted advertisement can be an advertisement that is selected based on a demographic of a user of playback device 240.

Playback-modification module 247 can be configured to modify playback of replacement media content. For example, in line with the discussion above, prior to carrying out a media content replacement event, playback-modification module 247 can receive an instruction to present second media content in a muted state. The instruction could be received from audio analysis module 243. Based on receiving the instruction, playback-modification module 247 can cause playback device 240 to present the second media content in a muted state. Playback modification module 247 can cause playback device 240 to present the second media content in a muted state by outputting a mute command. For instance, playback modification module 247 can provide a mute command to a media player that is used for presenting the second media content. Reception of the mute command can cause media player to present the second media content in the muted state. Playback-modification module 247 can also cause a mute symbol overlay to be rendered with the second media content when the second media content is presented in the muted state.

In some examples, each time playback device 240 presents the second media content in a muted state, playback device 240 can log the fact that a consumer did not receive the audio portion of the second media content in a database. Playback device 240 can maintain a log including data indicative of instances in which second media content is presented in a muted state, and can provide this log to a server. The log can include an identifier of the second media content, as well as an indication of when the second media content was presented.

III. Example Operations

Figure 5:
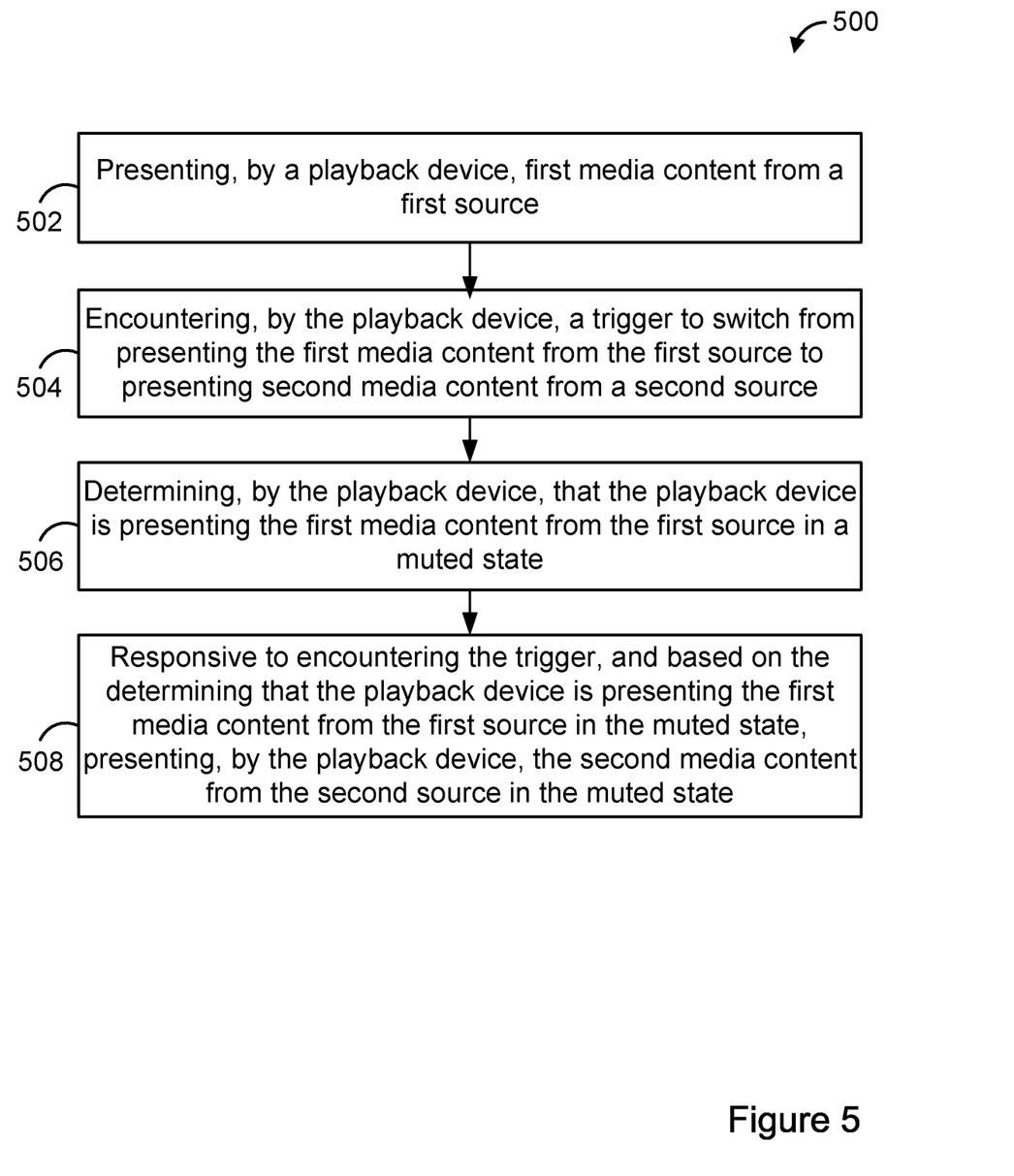
FIG. 5 is a flow chart of an example method.

FIG. 5 is a flow chart of an example method 500. Method 500 can be carried out by a playback device, such as playback device 240 or more generally, by a computing system. At block 502, method 500 includes presenting, by a playback device, first media content from a first source. At block 504, method 500 includes encountering, by the playback device, a trigger to switch from presenting the first media content from the first source to presenting second media content from a second source. At block 506, method 500 includes determining, by the playback device, that the playback device is presenting the first media content from the first source in a muted state. And at block 508, method 500 includes responsive to encountering the trigger, and based on the determining that the playback device is presenting the first media content from the first source in the muted state, presenting, by the playback device, the second media content from the second source in the muted state.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A computing system configured for performing a set of acts comprising:
    encountering a trigger to replace a replaceable content segment of media content with a replacement content segment, wherein the media content is provided to a playback device by a media device, and wherein the replacement content segment is stored in a local cache of the playback device;
    detecting, within an audio signal associated with the media content, a silent period having a duration that exceeds a threshold duration;
    determining that the silent period is within a threshold time of a time at which the playback device is scheduled replace the replaceable content segment;
    based on detecting the silent period having the duration that exceeds the threshold duration and determining that the silent period is within the threshold time of the time at which the playback device is scheduled to replace the replaceable content segment, determining that the media device is providing the media content to the playback device in a muted state;
    responsive to encountering the trigger, and based on the determining that the media device is providing the media content to the playback device in the muted state, presenting the replacement content segment in the muted state and in place of the replaceable content segment; and
    storing audibility data indicative of the presenting of the replacement content segment in the muted state.

2. The computing system of claim 1, wherein the audibility data indicative of the presenting of the replacement content segment in the muted state comprises an identifier of the replacement content segment and an indication of when the replacement content segment was presented.

3. The computing system of claim 2, wherein the set of acts further comprises providing the audibility data to a server.

4. The computing system of claim 1, wherein encountering the trigger comprises determining that a first segment occurring immediately prior to a second segment is being presented, wherein the second segment is designated to be replaced with the replacement content segment.

5. The computing system of claim 4, wherein the first segment is a first advertisement, and wherein the second segment is a second advertisement.

6. A method comprising:
encountering, by a playback device, a trigger to replace a replaceable content segment of media content with a replacement content segment, wherein the media content is provided to the playback device by a media device, and wherein the replacement content segment is stored in a local cache of the playback device;
detecting, by the playback device, within an audio signal associated with the media content, a silent period having a duration that exceeds a threshold duration;
determining, by the playback device, that the silent period is within a threshold time of a time at which a playback device is scheduled to replace the replaceable content segment;
based on detecting the silent period having the duration that exceeds the threshold duration and determining that the silent period is within the threshold time of the time at which the playback device is scheduled to replace the replaceable content segment, determining, by the playback device, that the media device is providing the media content to the playback device in a muted state;
responsive to encountering the trigger, and based on the determining that the media device is providing the media content to the playback device in the muted state, presenting, by the playback device, the replacement content segment in the muted state; and
storing audibility data indicative of the presenting of the replacement content segment in the muted state.

7. The method of claim 6, wherein the audibility data indicative of the presenting of the replacement content segment in the muted state comprises an identifier of the replacement content segment and an indication of when the replacement content segment was presented.

8. The method of claim 7, further comprising providing the audibility data to a server.

9. A non-transitory computer-readable medium having stored thereon program instructions that upon execution by a processor, cause performance of a set of acts comprising:
encountering a trigger to replace a replaceable content segment of media content with a replacement content segment, wherein the media content is provided to a playback device by a media device, and wherein the replacement content segment is stored in a local cache of the playback device;
detecting, within an audio signal associated with the media content, a silent period having a duration that exceeds a threshold duration;
determining that the silent period is within a threshold time of a time at which the playback device is scheduled to replace the replaceable content segment;
based on detecting the silent period having the duration that exceeds the threshold duration and determining that the silent period is within the threshold time of the time at which the playback device is scheduled to replace the replaceable content segment, determining that the media device is providing the media content to the playback device in a muted state;
responsive to encountering the trigger, and based on the determining that the media device is providing the media content to the playback device in the muted state, presenting the replacement content segment in the muted state and in place of the replaceable content segment; and
storing audibility data indicative of the presenting of the replacement content segment in the muted state.

10. The non-transitory computer-readable medium of claim 9, wherein the audibility data indicative of the presenting of the replacement content segment in the muted state comprises an identifier of the replacement content segment and an indication of when the replacement content segment was presented.

11. The non-transitory computer-readable medium of claim 9, wherein the set of acts further comprises providing the audibility data to a server.

\* \* \* \* \*

UNITED STATES PATENT AND TRADEMARK OFFICE
CERTIFICATE OF CORRECTION

PATENT NO. : 11,317,144 B2
APPLICATION NO. : 16/847532
DATED : April 26, 2022
INVENTOR(S) : Shashank Merchant and Markus K. Cremer It is certified that error appears in the above-identified patent and that said Letters Patent is hereby corrected as shown below:

In the Claims

Column 12 Claim 1, Line 14: insert the word --to-- after "scheduled".

Signed and Sealed this
Fourteenth Day of June, 2022

Katherine Kelly Vidal
*Director of the United States Patent and Trademark Office*